3,098,007
ANTHELMINTIC 5-ARYLAZO RHODANINES
Gerald Brody, Quincy, Ill., assignor to Moorman Manufacturing Company, Quincy, Ill., a corporation of Illinois
No Drawing. Filed Jan. 17, 1962, Ser. No. 166,905
13 Claims. (Cl. 167—53.1)

This invention relates generally to the prevention, elimination, treatment and control of the large ascarid roundworm, *Ascaridia galli*, in poultry, and to ascarids and hookworms in dogs and to medicated feed compositions and rations therefor. More particularly, it relates to the use, for these purposes, of 5(nitrophenylazo) rhodanines having the following structural formula:

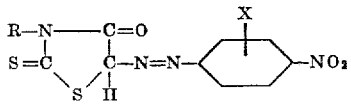

in which R represents the hydrogen, methyl, ethyl, propyl, or butyl groups and X represents methyl, chloro and nitro substituents.

The large poultry roundworm, *A. galli*, is extremely common and often results in decreased feed intake, retarded growth, increased susceptibility to other disease organisms, and if present in sufficient numbers, in death of the bird. As many as 600 worms averaging three inches in length have been recovered from a naturally infected bird.

This parasitic infection is spread by mature female worms which produce worm eggs in great numbers which are passed out into the external environment with chicken fecal droppings. Under ideal environmental conditions of moisture and temperature, the eggs mature and can become infective in about two weeks. Ingestion of infective eggs by other birds completes the life cycle, and in about fifty days the newly ingested infective eggs produce mature worms capable of reproduction.

Approximately one-third of all dogs harbor internal worms with ascarids and hookworms constituting the commonest types of worm infection in dogs. In general, ascarids and hookworms in dogs can cause nutritional deficiencies resulting in depressed growth and development. Dog hookworms are blood suckers and are especially dangerous to young pups causing anemia, unthriftiness and even death of entire litters of pups. *Toxocara canis*, the commonest type of ascarid in dogs, has a complex life cycle with the larvae migrating to various parts of the body, especially the liver and lungs, before maturation in the small intestine. This migratory phase can cause severe pneumonia in growing pups, and in pregnant dogs can cause prenatal infection of newly born pups contributing to weak or still-born pups.

The active ingredients of this invention effectively expel mature *A. galli* worms when administered in poultry feed at 0.00625%–0.20% by weight in the ration for one to four days. When administered continuously at 0.0125–0.10% by weight in the ration, starting at the time of exposure to infective ascarid eggs, these compounds are highly effective in expelling immature worms and retarding the growth and development of those worms which remain in the bird. Thus, these compounds administered continuously in feed to young birds can break the life cycle of this important poultry parasite.

The active ingredients of this invention also effectively expel mature dog ascarids and hookworms when administered in the ration of the dog. Although the optimal dosage for a given dog varies with the age and weight of the dog, in general, good results were obtained when the total drug intake ranged from 100–150 mg./kg. body weight administered over a 1–5 day treatment period. When administered at lower levels (4.4–8.9 mg./kg./day) for longer periods of time, these compounds suppress the production of ascarid and hookwork eggs. The percentage of drugs in the feed would vary with the age and body weight of the dog. For the 1–5 day treatment the percentage of drug in feed varied from 0.022–0.33% and as low as 0.0088% for the low level feeding program.

Accordingly, the object of this invention, generally stated, is the provision of new and improved medicated feed formulations, compositions and rations which are safe, reliable, efficient and economical when used for the elimination, treatment, control and prevention of the large poultry roundworms, *A. galli*, in poultry and ascarid and hookwork infection in dogs.

Certain other objects of the invention will in part be obvious and will in part appear hereinafter.

For a more complete understanding of the nature and scope of the present invention, reference may be made to the following detailed description and illustrative examples which may be used to practice the invention and which will suggest other and additional embodiments of the invention to those skilled in the art.

EXAMPLE 1

Mature birds (chickens) which had been exposed to natural worm infections were housed in individual cages and fecal samples taken to ascertain presence of *A. galli* infections. All birds shown to harbor this parasite were subsequently used in anthelmintic tests. Medicated feeds containing these 5(nitrophenylazo) rhodanine compounds were prepared by admixing 1 gram of active ingredient in 1000 grams poultry ration (2 parts of ground corn and 1 part of commercial chick concentrate) to produce a medicated feed containing 0.10% active ingredient by weight. In a similar manner, medicated feeds containing other concentrations of active ingredient were prepared.

In experiments 108 and 131, the birds were weighed, housed in individual cages and put on medicated feed containing 0.10% 3-methyl, 5(P-nitrophenylazo) rhodanine for 7 and 3 days, respectively. All droppings eliminated from the test birds were carefully examined for expelled worms during the entire period of medication. The day following termination of medication, the birds were sacrificed and all worms remaining in the intestinal tract were recorded. The initial worm infection represents the sum of the worms expelled and those remaining in the gut. Efficacy of treatment is calculated as follows:

$$\text{Efficacy (percent)} = \frac{\text{Number of worms expelled}}{\text{Total initial infection}} \times 100$$

In experiment 110, naturally infected birds were allotted at random into two groups of seven birds per lot. One group was fed 0.10% 3-methyl, 5(P-nitrophenylazo) rhodanine for seven days whereas the other group did not receive any medication and thus served as non-medicated control. At the end of the seven-day experimental period, all birds in both lots were sacrificed and the number of worms found in the intestinal tracts were recorded. Efficacy of treatment was ascertained by comparison of the worm burdens present in the treated birds as compared to the non-treated birds.

The results of these three experiments, which are summarized in Table 1, clearly indicate the excellent anthelmintic activity of 3-methyl, 5(P-nitrophenylazo) rhodanine.

Table 1
ANTHELMINTIC ACTIVITY OF 3-METHYL, 5(P-NITROPHENYLAZO) RHODANINE ADMINISTERED AT 0.10% IN POULTRY FEED AGAINST MATURE *ASCARIDIA GALLI* INFECTIONS

| Feeding method | Expt. Number | Number days on medication | Total drug intake per bird (mg/kg.) | Number birds | Total worms Initial | Total worms At autopsy | Efficacy (percent) |
|---|---|---|---|---|---|---|---|
| Individual cages | G-108 | 7 | 425.6 | 3 | 38 | 0 | 100.0 |
|  | G-131 | 3 | 159.6 | 4 | 60 | 2 | 96.7 |
| Grouped birds | G-110 | 0 | 0 | 7 |  | 154 |  |
|  | G-110 | 7 | 599.9 | 7 |  | 6 | 96.1 |

EXAMPLE 2

The anthelmintic activity of other 5(nitrophenylazo) rhodanine compounds using techniques described in the previous example was studied and the following compounds were found to exhibit good anthelmintic activity:

5(P-nitrophenylazo) rhodanine
3-methyl, 5(P-nitrophenylazo) rhodanine
3-ethyl, 5(P-nitrophenylazo) rhodanine
3-n-propyl, 5(P-nitrophenylazo) rhodanine
3-isopropyl, 5(P-nitrophenylazo) rhodanine
3-n-butyl, 5(P-nitrophenylazo) rhodanine
3-methyl, 5(2′,4′ dinitrophenylazo) rhodanine
3-methyl, 5(2′methyl, 4′nitrophenylazo) rhodanine
3-methyl, 5(2′chloro, 4′nitrophenylazo) rhodanine As seen in Table 2, administration of the anthelmintics at levels of 0.00625%–0.10% in feed for 1–4 days was very effective in expelling mature poultry ascarids.

Table 2
ANTHELMINTIC ACTIVITY OF 5-ARYLAZO RHODANINES ADMINISTERED AT SEVERAL LEVELS IN FEED FOR SEVERAL INTERVALS OF TIME AGAINST MATURE *ASCARIDIA GALLI* INFECTIONS

| Feeding method (Expt. No.) | Percent drug in feed | Number days on medication | Substituent on rhodanine ring 3-position | Substituent on rhodanine ring 5-position | Total drug intake per bird (mg./kg.) | Number birds | Total worms Initial | Total worms At autopsy | Efficacy (percent) |
|---|---|---|---|---|---|---|---|---|---|
| Individual cages (G-139 and G-146) | 0.10 | 3 | Methyl | P-nitrophenylazo | 187.6 | 1 | 1 | 0 | 100.0 |
|  |  |  | Ethyl | do | 169.7 | 2 | 13 | 0 | 100.0 |
|  |  |  | n-Propyl | do | 182.5 | 2 | 401 | 0 | 100.0 |
|  |  |  | Hydrogen | do | 185.3 | 3 | 82 | 1 | 98.8 |
|  | 0.10 | 2 | do | do | 101.3 | 5 | 267 | 4 | 98.5 |
|  | 0.05 | 3 | Methyl | do | 62.2 | 1 | 6 | 0 | 100.0 |
|  |  |  | Ethyl | do | 75.2 | 3 | 681 | 22 | 96.8 |
|  |  |  | n-Propyl | do | 91.6 | 3 | 414 | 85 | 79.4 |
|  |  |  | Hydrogen | do | 72.3 | 5 | 753 | 204 | 72.9 |
|  |  |  | Methyl | 2,4 dinitrophenylazo | 54.2 | 2 | 134 | 19 | 85.8 |
|  | 0.05 | 2 | Hydrogen | P-nitrophenylazo | 58.7 | 5 | 731 | 288 | 60.6 |
|  | 0.20 | 1 | do | do | 90.3 | 5 | 258 | 25 | 90.3 |
| Grouped birds (G-211) | 0.025 | 4 | Methyl | do | 96.5 | 8 |  | 23 | 97.7 |
|  |  |  | n-Butyl | do | 102.2 | 8 |  | 13 | 98.7 |
|  |  |  | Methyl | 2,4 dinitrophenylazo | 102.0 | 8 |  | 281 | 72.6 |
|  |  |  | do | 2 methyl, 4 nitrophenylazo | 86.6 | 8 |  | 0 | 100.0 |
|  |  |  | do | 2 chloro, 4 nitrophenylazo | 100.3 | 8 |  | 0 | 100.0 |
|  |  |  | Non-medicated control |  | 0 | 8 |  | 1,023 |  |
| Grouped birds (G-213) | 0.0075 | 4 | Methyl | 2 methyl, 4 nitrophenylazo | 24.8 | 8 |  | 4 | 99.7 |
|  |  |  | do | 2 chloro, 4 nitrophenylazo | 32.1 | 8 |  | 69 | 95.4 |
|  |  |  | Non-medicated control |  | 0 | 7 |  | 1,301 |  |
| Individual cages (G-212B) | 0.00625 | 4 | Methyl | 2 methyl, 4 nitrophenylazo | 21.9 | 6 | 1,096 | 31 | 97.2 |
|  |  |  | do | 2 chloro, 4 nitrophenylazo | 22.2 | 6 | 915 | 7 | 99.2 |

A summary of anthelmintic activity of the various 5-arylazo rhodanines against mature poultry ascarids is presented in Table 3.

Table 3
SUMMARY OF ANTHELMINTIC ACTIVITY OF 5-ARYLAZO RHODANINES ADMINISTERED IN FEED AGAINST MATURE POULTRY ASCARIDS—INDIVIDUAL CAGED BIRD STUDIES

| Substituent on rhodanine ring | | Percent anthelmintic activity at various levels of total drug intake expressed as mg./kg.; ( ) equals number of birds | | | | |
|---|---|---|---|---|---|---|
| 3-position | 5-position | 100 | 75 | 50 | 25 | 12.5 |
| Hydrogen | 4 nitrophenylazo | 83.6 (11) | 81.6 ( 7) | 73.5 ( 4) | 2.3 ( 2) |  |
| Methyl | do | 97.3 (20) | 94.7 (12) | 77.9 (45) | 67.6 (24) | 35.4 (14) |
| Ethyl | do | 100.0 ( 4) | 95.2 ( 6) | 66.7 ( 5) | 73.0 (10) |  |
| n-Propyl | do | 92.3 ( 6) | 100.0 ( 5) | 37.7 (16) | 64.9 ( 7) |  |
| i-Proply | do | 97.2 ( 3) | 82.0 ( 6) | 87.5 ( 5) | 67.9 (18) |  |
| n-Butyl | do | 100.0 ( 3) | 100.0 ( 6) | 86.2 (18) | 82.1 ( 3) |  |
| Methyl | 2,4 dinitrophenylazo |  |  | 75.4 ( 8) | 58.8 ( 1) |  |
| Do | 2-chloro, 4 nitrophenylazo | 100.0 ( 2) |  |  | 99.2 ( 8) | 88.5 ( 7) |
| Do | 2-methyl, 4 nitrophenylazo |  | 100.0 ( 2) |  | 97.7 ( 9) | 53.4 ( 7) |

EXAMPLE 3

In order to evaluate activity of these compounds against immature stages of *A. galli*, one-week-old White Leghorn chicks were artificially infected with 300–550 infective worm eggs per bird. Medicated feeds containing an active drug concentration ranging from 0.025–0.10% by weight were administered continuously from the time of infection when the birds were one week of age until the infection was four weeks old at which time all birds were sacrificed and worm burdens of the various experimental groups ascertained. Typical results, presented in Table 4 below indicate that continuous feeding of 3-methyl, 5(P-nitrophenylazo) rhodanine, 5(P-nitrophenylazo) rhodanine, 3-methyl, 5(2′ methyl, 4′ nitrophenylazo) rhodanine, and 3-methyl, 5(2′ chloro, 4′ nitrophenylazo) rhodanine is highly effective in controlling immature *A. galli* infections. Similar tests have demonstrated comparable activity of the other members of this series against immature *A. galli* infections.

tinuous administration of anthelmintics in poultry rations to control *A. galli* infections, it is important that these anthelmintic rations do not interfere with the animal's normal health and growth. An anthelmintic ration containing 0.05% 3-methyl, 5(P-nitrophenylazo) rhodanine was fed to 25 straight-run birds for a nine-week period and the results indicate that this anthelmintic ration did not adversely affect weight gains or efficiency of feed conversion (Table 6). In addition, all birds attained complete and normal sexual maturity. In order to further demonstrate the safety of these 5(nitrophenylazo)

*Table 4*

EFFICACY OF 5-ARYLAZO RHODANINES ADMINISTERED IN FEED FOR FOUR WEEKS IN THE CONTROL OF IMMATURE *ASCARIDIA GALLI* INFECTIONS

| Expt. No. | Number *A. galli* ova per bird | Substituent on rhodanine ring | | Percent drug in feed | Number birds per lot | Avg., worm number at 4 weeks | Efficacy, percent |
|---|---|---|---|---|---|---|---|
| | | 3-position | 5-position | | | | |
| G-105 | 550 | Non-medicated control | | | 20 | 11.8 | |
| | | Methyl | P-nitrophenylazo | 0.10 | 10 | 0.9 | 92.4 |
| | | do | do | 0.05 | 10 | 1.6 | 86.4 |
| G-121 | 300 | Non-medicated control | | | 10 | 12.9 | |
| | | Methyl | P-nitrophenylazo | 0.05 | 10 | 1.3 | 89.9 |
| | | do | do | 0.025 | 10 | 3.7 | 71.3 |
| | | Hydrogen | do | 0.05 | 10 | 1.3 | 89.9 |
| | | do | do | 0.025 | 10 | 2.8 | 78.3 |
| G-209 | 300 | Non-medicated control | | | 11 | 39.2 | |
| | | Methyl | P-nitrophenylazo | 0.05 | 12 | 1.1 | 97.2 |
| | | do | 2-methyl, 4-nitrophenylazo | 0.05 | 12 | 0.1 | 99.7 |
| | | do | 2-chloro, 4-nitrophenylazo | 0.05 | 12 | 0 | 100.0 |

The 5(P-nitrophenylazo) rhodanine compounds were tested under natural farm conditions and the results are tabulated in Table 5.

rhodanines, 3-methyl, 5(P-nitrophenylazo) rhodanine was administered in a single oral capsule dose and results indicate that a single oral dose as high as 2900 mg./kg.

*Table 5*

ACTIVITY OF GRADED LEVELS OF 3-METHYL, 5(P-NITROPHENYLAZO) RHODANINE AND RELATED HOMOLOGS ADMINISTERED IN FEED FOR TEN WEEKS AGAINST NATURAL INFECTIONS OF *ASCARIDIA GALLI* AT THE MOORMAN RESEARCH FARM

| Farm Expt. No. | 3-alkyl substituent | Percent drug in feed | Number birds/lot [1] | | Body weight (lb.) at 10 weeks | Lb. feed/lb. surviving bird | Point spread [2] | Percent worm control at weeks | | | |
|---|---|---|---|---|---|---|---|---|---|---|---|
| | | | Started | Dead | | | | 4 | 6 | 8 | 10 |
| 813B | No drug | 0 | 104 | 4 | 3.73 | 2.75 | 98 | | | | |
| | Methyl | 0.10 | 104 | 2 | 3.53 | 2.59 | 94 | 57 | 97 | 98 | 100 |
| | do | 0.05 | 103 | 3 | 3.70 | 2.71 | 99 | 46 | 95 | 98 | 100 |
| | do | 0.25 | 105 | 2 | 3.83 | 2.52 | 131 | 95 | 94 | 98 | 100 |
| | do | 0.0125 | 104 | 4 | 3.79 | 2.61 | 118 | 76 | 36 | 41 | 98 |
| 846B | No drug | 0 | 77 | 2 | 3.66 | 2.56 | 110 | | | | |
| | Methyl | 0.0175 | 76 | 0 | 3.80 | 2.50 | 130 | 78 | 98 | 98 | 98 |
| | do | 0.0125 | 76 | 1 | 3.82 | 2.51 | 131 | 40 | 64 | 68 | 83 |
| | Ethyl | 0.0125 | 76 | 4 | 3.80 | 2.66 | 114 | 0 | 20 | 25 | 47 |
| | n-Propyl | 0.0125 | 76 | 2 | 3.67 | 2.71 | 96 | 69 | 74 | 61 | 77 |
| | i-Propyl | 0.0125 | 76 | 4 | 3.84 | 2.64 | 120 | 53 | 56 | 36 | 72 |
| | n-Butyl | 0.0125 | 76 | 0 | 3.69 | 2.60 | 109 | 81 | 62 | 82 | 84 |

[1] At two-week intervals, 15 birds per lot were removed and killed for determination of worm burdens.
[2] Point spread equals 100×(body weight−feed efficiency).

EXAMPLE 4

Since one of the objectives of this invention is the conbody weight had no adverse effect on survival of five-week-old pullets (Table 7). Therefore, the minimum lethal dose is in excess of 2900 mg./kg.

Table 6

EFFECT OF ADMINISTRATION OF 3-METHYL, 5(P-NITROPHENYLAZO) RHODANINE IN FEED FOR NINE WEEKS ON WEIGHT GAINS AND EFFICACY OF FEED CONVERSION IN STRAIGHT RUN WHITE LEGHORN BIRDS (EXPT. G-128)

| Percent drug in feed | 0 | 0.05 |
|---|---|---|
| Number birds per lot: | | |
| Initial | 25 | 25 |
| Alive at 9 weeks | 24 | 24 |
| Avg. body weight in lb. at 9 weeks | 1.81 | 1.81 |
| Feed in lb. consumed per bird in 9 weeks | 6.15 | 5.52 |
| Lb. feed per lb. gain | 3.59 | 3.23 |

Table 7

EFFECT OF SINGLE ORAL CAPSULE ADMINISTRATION OF 3-METHYL, 5(P-NITROPHENYLAZO) RHODANINE ON MORTALITY AND WEIGHT GAINS IN FIVE-WEEK-OLD WHITE LEGHORN PULLETS (EXPT. G-128)

| Group | Mean drug intake (mg./kg.) | Range of drug intake | Number birds Initial | Number birds Dead | Percent weight gain in 10 days |
|---|---|---|---|---|---|
| D | 0 | | 9 | 0 | 63 |
| A | 910 | 848–1,012 | 10 | 0 | 59 |
| B | 1,613 | 1,495–1,666 | 10 | 0 | 63 |
| C | 2,777 | 2,725–2,901 | 10 | 0 | 60 |

The 5(nitrophenylazo) rhodanines, or mixtures thereof may be fed to poultry by including it in the ration in one of several different ways as illustrated by the following example:

EXAMPLE 5

A suitable basal broiler ration comprises

| | Lbs. |
|---|---|
| Ground yellow corn | 67 |
| Commercial chick concentrate (medicated) | 33 |
| Total | 100 |

The commercial chick concentrate was a typical one containing soybean oil meal, alfalfa, meat scrap, fish meal, a complex mineral mix, vitamin sources and antibiotic supplement (penicillin) in usual known proportions to provide a high energy chick feed when mixed with corn. Into such a chick concentrate sufficient 5(nitrophenylazo) rhodanine is blended to give a concentration of from 0.0375% to 0.6% by weight.

The active ingredients may also be administered in the drinking water, in tablet form, or in capsules. However, incorporation of the active ingredients in the feed represents the preferred method.

In addition to exhibiting anthelmintic activity in poultry as set forth above, 3-n-butyl, 5(P-nitrophenylazo) rhodanine and 3-methyl, 5(2′methyl, 4′nitrophenylazo) rhodanine also exhibit good coccidiostat activity. This is illustrated by the data contained in Table 8.

Table 8

COCCIDIOSTAT EVALUATION OF 5-ARYLAZO RHODANINES AGAINST MIXED INFECTIONS OF E. TENELLA AND E. NECATRIX [1]

| Expt. No. | Percent drug | Substituent on rhodanine ring 3-position | Substituent on rhodanine ring 5-position | Number oocysts per bird | Number birds Initial | Number birds Dead of coccidiosis | Percent survival | Percent weight gain in 7 days | Coccidiostat index [2] |
|---|---|---|---|---|---|---|---|---|---|
| C-79 | 0 | | | 0 | 10 | 0 | 100 | 100 | 200 |
| | 0 | | | 40,000 | 10 | 7 | 30 | −7 | 23 |
| | 0.05 | Hydrogen | P-nitrophenylazo | 40,000 | 10 | 7 | 30 | −21 | 9 |
| | 0.05 | Methyl | do | 40,000 | 10 | 5 | 50 | 4 | 54 |
| | 0.05 | Ethyl | do | 40,000 | 10 | 5 | 50 | 45 | 95 |
| | 0.05 | n-Propyl | do | 40,000 | 10 | 5 | 50 | −18 | 32 |
| | 0.05 | i-Propyl | do | 40,000 | 10 | 5 | 50 | 17 | 67 |
| | 0.05 | n-Butyl | do | 40,000 | 10 | 1 | 90 | 83 | 173 |
| C-80 | 0 | | | 0 | 10 | 0 | 100 | 100 | 200 |
| | 0 | | | 40,000 | 10 | 5 | 50 | −1 | 49 |
| | 0.005 | n-Butyl | P-nitrophenylazo | 40,000 | 10 | 4 | 60 | −15 | 45 |
| | 0.01 | do | do | 40,000 | 10 | 7 | 30 | 17 | 47 |
| | 0.02 | do | do | 40,000 | 10 | 1 | 90 | 58 | 148 |
| | 0.03 | do | do | 40,000 | 10 | 1 | 90 | 60 | 150 |
| | 0.04 | do | do | 40,000 | 10 | 0 | 100 | 82 | 182 |
| | 0.05 | do | do | 40,000 | 10 | 0 | 100 | 58 | 158 |
| C-90 | 0 | | | 0 | 12 | 0 | 100 | 100 | 200 |
| | 0 | | | 288,000 | 12 | 4 | 67 | 14 | 81 |
| | 0.05 | n-Butyl | P-nitrophenylazo | 288,000 | 12 | 0 | 100 | 49 | 149 |
| | 0.025 | do | do | 288,000 | 11 | 0 | 100 | 46 | 146 |
| | 0.05 | Methyl | 2,4 dinitrophenylazo | 288,000 | 11 | 2 | 82 | −21 | 61 |
| | 0.05 | do | 2 chloro, 4 nitrophenylazo | 288,000 | 12 | 1 | 92 | −3 | 89 |
| | 0.05 | do | 2 methyl, 4 nitrophenylazo | 288,000 | 12 | 0 | 100 | 42 | 142 |
| | 0.025 | do | do | 288,000 | 12 | 1 | 92 | 22 | 114 |
| | 0.0125 | do | do | 288,000 | 11 | 2 | 82 | 19 | 101 |

[1] The birds were allotted according to body weight and put on medication. The next day the birds were infected with a mixed coccidia culture. Seven days later the birds were weighed and the experiment terminated.
[2] Percent survival and weight gain data can be combined to provide an index of efficacy called the "Coccidiostat Index" which is the sum of the percent survival and percent weight gain in the seven day period following infection. The maximum value of the index is 200 for non-infected birds (100% survival and 100% weight gain equals 200).

EXAMPLE 6

Using the techniques for critical evaluation of anthelmintic activity described in Example 1, the activity of the 5(nitrophenylazo) rhodanines was studied in dogs naturally infected with hookworms and ascarids. Administration of the therapeutic dose in feed (approximately 100 mg./kg.) over a 5-day period was used and the data presented in Table 9 illustrates the relative anthelmintic activity of typical 5(nitrophenylazo) rhodanines. As seen in Table 10, administration of 3 methyl, 5(P-nitrophenylazo) rhodanine at low levels in feed for 15 days was effective in suppressing the production of ascarid and hookworm eggs. Thus, administration of these compounds administered continuously in the ration of dogs can prevent contamination of dog runs and thus break the life cycle of ascarids and hookworms in dogs in the same manner as described above in connection with poultry.

Table 9

ANTHELMINTIC ACTIVITY OF 5-ARYLAZO RHODANINES ADMINISTERED IN FEED FOR FIVE DAYS AGAINST HOOKWORM AND ASCARID INFECTIONS IN NATURALLY INFECTED DOGS

| Parasite | Substituent on rhodanine ring | | Total drug intake per dog (mg./kg.) | Number dogs | Total worms | | Efficacy (percent) |
|---|---|---|---|---|---|---|---|
| | 3-position | 5-position | | | Initial | At autopsy | |
| Hookworm | Methyl | P-nitrophenylazo | 55.0 | 2 | 402 | 0 | 100.0 |
| | | | 90.0 | 1 | 206 | 3 | 98.5 |
| | | | 100.0 | 2 | 193 | 1 | 99.5 |
| | | | 110.0 | 5 | 176 | 7 | 96.0 |
| | do | 2 methyl, 4 nitrophenylazo | 110.0 | 1 | 4 | 0 | 100.0 |
| Ascarid | do | P-nitrophenylazo | 90.0 | 1 | 2 | 0 | 100.0 |
| | | | 110.0 | 4 | 49 | 7 | 85.7 |
| | Ethyl | do | 107.5 | 2 | 9 | 4 | 55.6 |
| | n-Propyl | do | 113.0 | 2 | 18 | 9 | 50.0 |
| | i-Propyl | do | 94.0 | 1 | 6 | 1 | 83.3 |
| | n-Butyl | do | 113.0 | 1 | 7 | 0 | 100.0 |
| | Methyl | 2 methyl, 4 nitrophenylazo | 110.0 | 1 | 16 | 0 | 100.0 |

Table 10

EFFECT OF 3-METHYL, 5(P-NITROPNENYLAZO) RHODANINE ADMINISTERED AT LOW LEVELS IN FEED FOR 15 DAYS ON SHEDDING OF HOOKWORM AND ASCARID EGGS (DOG EXPT. #6)

| Parasite | Dog No. | Drug intake (mg./kg.) | | Worm egg count (eggs per gram feces) | | |
|---|---|---|---|---|---|---|
| | | Per day | Total in 15 days | Start treatment | 13th day of treatment | 15th day post-treatment |
| Hookworm | 61B | 8.9 | 134.2 | 225 | 0 | 0 |
| | 62B | 8.5 | 127.4 | 420 | 0 | 0 |
| | 63B | 7.8 | 117.3 | 645 | 0 | (¹) |
| | 64B | 7.4 | 111.5 | 255 | 0 | 0 |
| | 65B | 6.7 | 99.9 | 435 | 0 | 0 |
| | 66B | 6.6 | 98.3 | 45 | (¹) | 0 |
| | 67B | 4.4 | 66.4 | 780 | 0 | 0 |
| Ascarid | 61B | 8.9 | 134.2 | 45 | 0 | 0 |
| | 62B | 8.5 | 127.4 | 945 | 0 | 45 |
| | 67B | 4.4 | 66.4 | 150 | 270 | 240 |

¹ No sample.

The 5(nitrophenylazo) rhodanine compounds useful in the present invention and methods of preparing the same, are disclosed in Patent No. 2,952,673. This present application is a continuation-in-part of prior application Serial No. 60,293, filed October 4, 1960, and of Serial No. 799,417, filed March 16, 1959, both of which are now abandoned.

In view of the foregoing disclosure, those skilled in the art will be able to practice the invention either as disclosed or in one or more other suitable and obvious manners.

I claim:

1. A medicated feed composition for treatment, control and prevention of ascarids in poultry and dogs, and hookworms in dogs comprising alimentary material containing sufficient 5(nitrophenylazo) rhodanine of the following structural formula to provide from about 0.00625% to about 0.2% by weight of a poultry ration and from about 0.0088% to about 0.33% by weight of a dog ration:

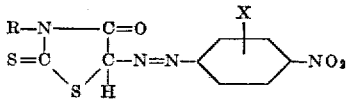

in which R represents a number selected from the group consisting of hydrogen, methyl, ethyl, propyl, and butyl radicals, and X represents a member selected from the group consisting of methyl, chloro and nitro substituents.

2. A medicated feed composition as defined in claim 1 in which the compound is 3-methyl, 5(P-nitrophenylazo) rhodanine.

3. A medicated feed composition as defined in claim 1 in which the compound is 3-ethyl, 5(P-nitrophenylazo) rhodanine.

4. A medicated feed composition as defined in claim 1 in which the compound is 3-n-butyl 5(P-nitrophenylazo) rhodanine.

5. A medicated feed composition as defined in claim 1 in which the compound is 3-methyl, 5(2' methyl, 4' nitrophenylazo) rhodanine.

6. A medicated feed composition as defined in claim 1 in which the compound is 3-methyl, 5(2' chloro, 4' nitrophenylazo) rhodanine.

7. Method of treating, controlling and preventing ascarids in poultry and dogs, and hookworms in dogs which comprises feeding poultry a ration containing from about 0.00625% to about 0.2% by weight and dogs a ration containing from about 0.0088% to about 0.33% by weight of 5(nitrophenylazo) rhodanine of the following structural formula:

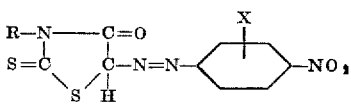

in which R represents a member selected from the group consisting of hydrogen, methyl, ethyl, propyl, and butyl radicals, and X represents a member selected from the group consisting of methyl, chloro and nitro substituents.

8. The method of treatment, control and prevention of ascarids in poultry and dogs, and hookworms in dogs as defined in claim 7 in which the compound is 3-methyl, 5(P-nitrophenylazo) rhodanine.

9. The method of treatment, control and prevention of ascarids in poultry and dogs, and hookworms in dogs as defined in claim 7 in which the compound is 3-ethyl, 5(P-nitrophenylazo) rhodanine.

10. The method of treatment, control and prevention of ascarids in poultry and dogs, and hookworms in dogs as defined in claim 7 in which the compound is 3-n-butyl, 5(P-nitrophenylazo) rhodanine.

11. The method of treatment, control and prevention of ascarids in poultry and dogs, and hookworms in dogs as defined in claim 7 in which the compound is 3-methyl, 5(2' methyl, 4' nitrophenylazo) rhodanine.

12. The method of treatment, control and prevention of ascarids in poultry and dogs, and hookworms in dogs as defined in claim 7 in which the compound is 3-methyl, 5(2' chloro, 4' nitrophenylazo) rhodanine.

13. The method of treating, controlling and preventing coccidiosis in poultry which comprises feeding poultry a ration containing from about 0.02% to about 0.2% by weight of n-butyl 5(P-nitrophenylazo) rhodanine and 3-methyl 5(2'methyl, 4'nitrophenylazo) rhodanine.

References Cited in the file of this patent
UNITED STATES PATENTS 2,743,211     Bashour _____ Apr. 24, 1956

OTHER REFERENCES

Mackie, Brit. J. Pharm. & Chemotherapy, vol. 10, pp. 7–9, 1955.

UNITED STATES PATENT OFFICE
CERTIFICATE OF CORRECTION

Patent No. 3,098,007                                      July 16, 1963

Gerald Brody

It is hereby certified that error appears in the above numbered patent requiring correction and that the said Letters Patent should read as corrected below.

Columns 5 and 6, Table 5, under the heading "Percent drug in feed", fourth value from the top, for "0.25" read -- 0.025 --.

Signed and sealed this 3rd day of March 1964.

(SEAL)
Attest:

ERNEST W. SWIDER                             EDWIN L. REYNOLDS

Attesting Officer                              Acting Commissioner of Patents